Figure 1:
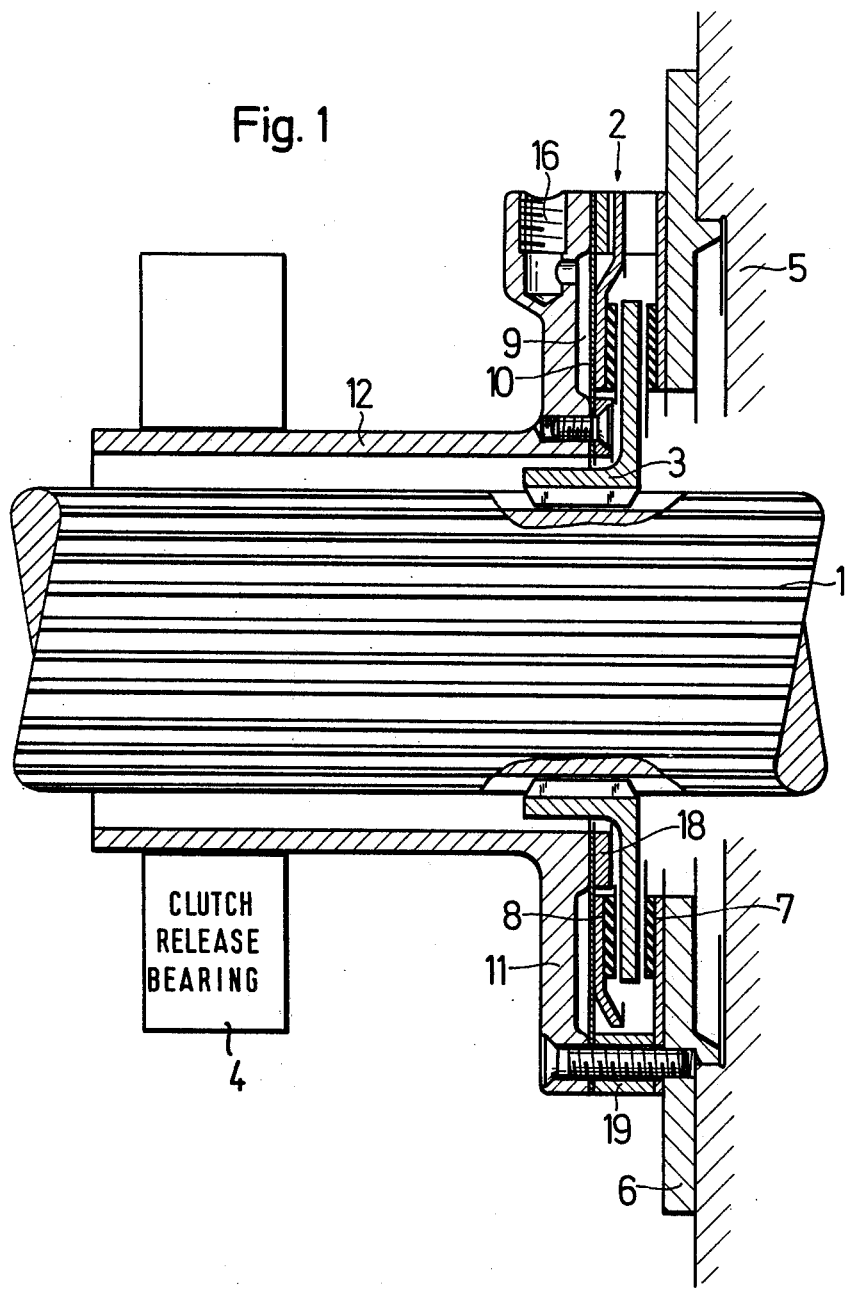

United States Patent [19]

Riese

[11] 4,014,420
[45] Mar. 29, 1977

[54] BRAKED AUTOMOTIVE FRICTION CLUTCH

[75] Inventor: Hans-Walter Riese, Dittelbrunn, Germany

[73] Assignee: Fichtel & Sachs A.G., Schweinfurt am Main, Germany

[22] Filed: Nov. 24, 1975

[21] Appl. No.: 634,837

[30] Foreign Application Priority Data

Dec. 16, 1974 Germany .......................... 2459403

[52] U.S. Cl. ........................... 192/13 R; 192/18 A
[51] Int. Cl.² ........................................ F16D 67/04
[58] Field of Search ............... 192/13 R, 4 A, 18 A

[56] References Cited

UNITED STATES PATENTS

| 3,020,721 | 2/1962 | Hipp | 192/13 R |
| 3,540,557 | 11/1970 | Hasselbacher | 192/13 R |
| 3,669,229 | 6/1972 | Ronayne | 192/18 A |
| 3,866,727 | 2/1975 | Myers | 192/13 R |

*Primary Examiner*—Benjamin W. Wyche
*Attorney, Agent, or Firm*—Hans Berman

[57] ABSTRACT

The output shaft of an automotive friction clutch may be braked during shifting of the transmission into higher gear by a brake disc secured against rotation on the shaft and axially moved into engagement with a friction member on a non-rotating element of the vehicle by a pressure plate backed by a resilient wall of a chamber to which a pressure fluid is admitted when the driver depresses the clutch pedal further than needed for only disengaging the clutch. A switch closed by the pedal opens a solenoid valve in the pressure line to the chamber.

5 Claims, 3 Drawing Figures

BRAKED AUTOMOTIVE FRICTION CLUTCH

This invention relates to automotive clutches, and particularly to a clutch equipped with a brake for reducing the rotary speed of the clutch shaft which is integral or otherwise coupled with the input shaft of the transmission.

A clutch equipped with a brake for slowing the clutch shaft has been disclosed in U.S. Pat. No. 2,863,537. It is a primary object of this invention to provide an improved braked clutch arrangement which permits the driver to slow the input shaft of the transmission selectively during shifting into higher gear. It is another object to provide a brake which remains effective without requiring adjustment when its friction facings wear.

According to the invention, a brake member is axially movable on the clutch shaft in angularly secured relationship. A friction member is mounted on an element of the support structure of the vehicle relative to which the shaft rotates about its axis. A pressure-fluid operated moving mechanism can move the brake member into engagement with the friction member. The clutch release mechanism for releasing the clutch shaft from a driven clutch portion includes a clutch control member mounted for movement between an inoperative position and a clutch releasing position, and further beyond the clutch releasing position. A fluid control device responds to the further movement of the control member for controlling flow of pressure fluid to the moving mechanism.

Figure 2:
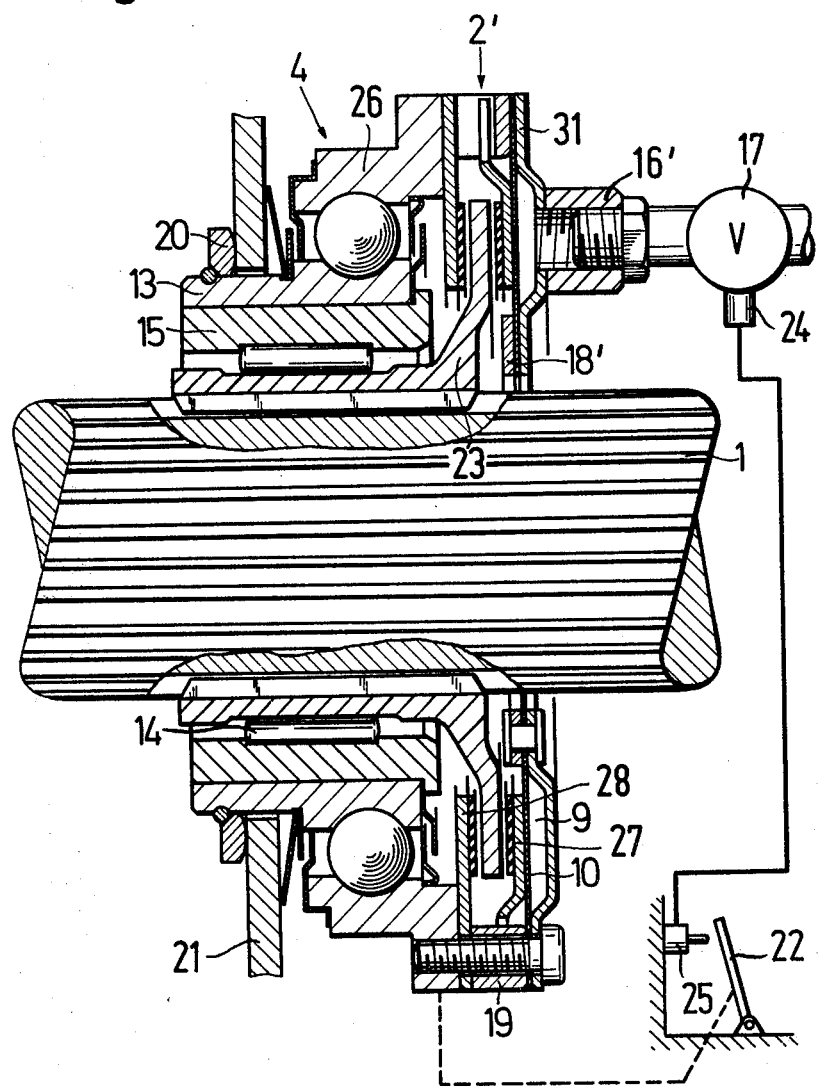
Figure 3:
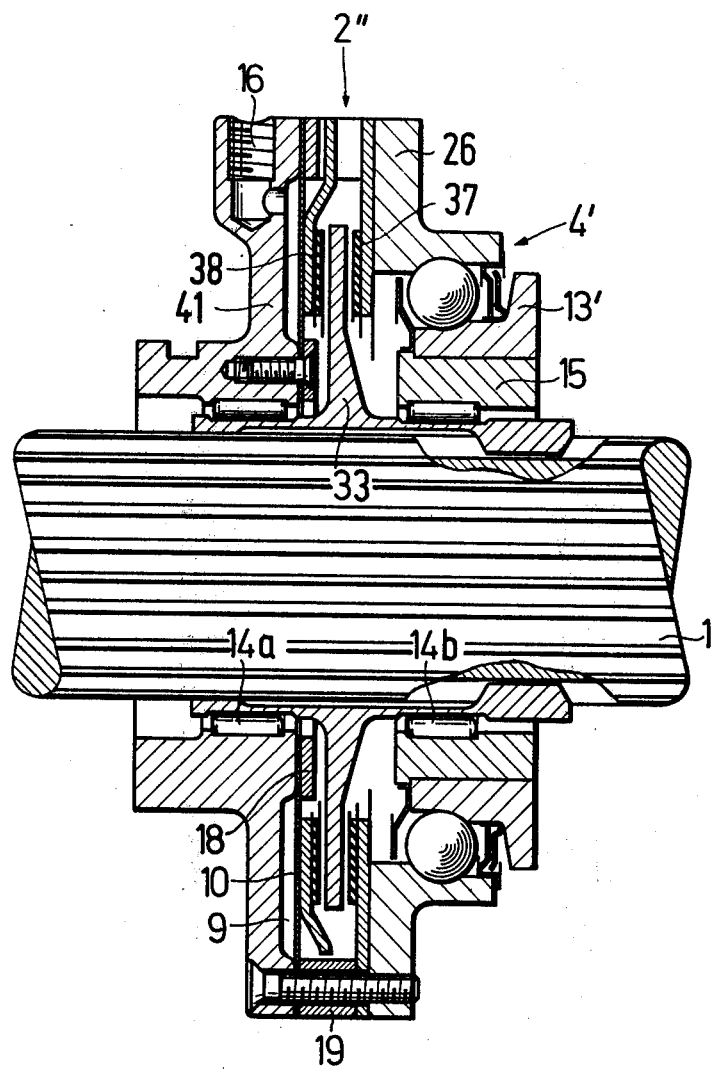

Other features, additional objects, and many of the attendant advantages of this invention will readily be appreciated as the same becomes better understood by reference to the following detailed description of preferred embodiments when considered in connection with the appended drawing in which:

FIG. 1 shows a braked automotive friction clutch of the invention in elevational section through its axis of rotation; and FIGS. 2 and 3 illustrate additional embodiments of the invention in respective views analogous to that of FIG. 1.

Referring initially to FIG. 1, there is shown only as much of a truck as is needed for an understanding of this invention. The clutch proper is represented by the clutch output shaft 1 which simultaneously constitutes the main drive shaft of a multiple-speed gear transmission. A brake mechanism 2 includes a brake disc 3 splined to the shaft 1 so that it may move axially on the shaft, but is secured against angular movement relative to the shaft. A clutch release bearing 4, conventional in itself, coaxially surrounds the shaft which is journaled in the transmission housing 5. The housing is fixedly mounted on the non-illustrated truck frame and is thus an element of the supporting structure of the truck.

The rear housing wall 6 of the brake mechanism 2 is a generally flat annular disc 6 fixedly mounted on the transmission housing 5 and coaxial with the shaft 1. Its front face carries a friction facing 7 spacedly adjacent the rear face of the brake disc 3 in the illustrated non-operative position of the brake mechanism 2. A similar friction facing is provided on an annular pressure plate 8 adjacent the front face of the brake disc 3. Rotation of the pressure plate 8 is prevented by radial projections engaging axially elongated openings in a cylindrical spacer ring 19 which separates the rear housing wall 6 from the front housing wall 11. The two radial housing walls 6, 11 and the spacer ring 19 are fixedly fastened to each other.

The rear face of the front wall 11 is formed with an annular groove 9 which forms a chamber sealed toward the pressure plate 8 by a resilient membrane 10. The outer edge of the membrane is clamped between the housing wall 11 and the spacer ring 19, while its central portion is clamped to the wall 11 by a flat ring 18 bolted to the wall. The wall 11 has an integral, tubular hub or sleeve 12 outside the brake housing on which the clutch release bearing 4 may be shifted axially by a non-illustrated fork connected to the driver's clutch pedal in a conventional manner.

An internally threaded port 16 in the circumferential face of the wall 11 communicates with the groove 9 and normally is connected to the compressed air tank of the truck's pneumatic brakes by a valved pressure line. As will presently be shown in FIG. 2, the valve in the pressure line normally vents the chamber 9 to the atmosphere, but may be operated by the driver to admit compressed air to the chamber 9 so that the pressure plate 8 engages the brake disc 3 and moves the brake disc 3 into frictional braking engagement with the friction facing 7 on the housing wall 6. Braking of the clutch shaft 1, while the shaft is disengaged from the driven clutch portion by the release bearing 4, facilitates shifting of the transmission into higher gear, particularly if the transmission is not synchronized. The brake mechanism 2 would interfere with down-shifting if operated simultaneously.

While the friction facing 7 in FIG. 1 is mounted directly on an element of the stationary support structure of the truck, the brake disc in a clutch brake of the invention may be frictionally engaged with a friction member capable of axial movement while secured against angular movement about the axis of the clutch shaft, and such clutch arrangements are shown in FIGS. 2 and 3.

In the clutch arrangement partly illustrated in FIG. 2, the brake disc 23 of a modified brake mechanism 2' has a tubular sleeve portion which is splined coaxially to the clutch shaft 1. A needle bearing 14 rotatably supports a cylindrical, tubular carrier 15 of the clutch release bearing 4. The inner bearing ring 13 of the clutch release bearing 4 is fixedly mounted on the carrier 15, and an abutment 20 on the bearing ring 16 bears against the clutch release fingers 21 of a non illustrated clutch releasing cup spring and disengages the clutch shaft 1 from the driven clutch portion in the usual manner when the bearing is moved rearward by the driver depressing a clutch pedal 22. A fork, not itself shown, but conventional and indicated in FIG. 2 by a broken line, connects the pedal 22 to the outer bearing ring 26 of the clutch release bearing and prevents rotation of the outer ring.

A front wall 28, a rear wall 31, and an interposed cylindrical spacer ring 19 constitute the housing of the brake mechanism 2' which is fixedly bolted to the outer bearing ring 26. The rear wall 31 bounds an annular chamber 9 which is sealed toward a pressure plate 27 by a resilient membrane 10 clamped peripherally between the rear wall 31 and the spacer ring 19, and centrally between the rear wall 31 and a flat ring 18' riveted to the wall 31. Radial projections prevent angular movement of the pressure plate 27 by engaging radial openings in the ring 19. A two-way valve 17 is connected to a nipple 16' on the rear wall 31 which communicates with the chamber 9.

The valve is spring-biased toward a position in which it vents the chamber 9 to the atmosphere. A solenoid 24 on the valve casing, when energized by a switch 25 under the pedal 22, turns the valve into a position in which it connects the chamber 9 through a flexible hose to the afore-mentioned, non-illustrated, compressed air tank, thereby moving the pressure plate 27 forward and clamping the brake disc 23 between friction facings on the pressure plate 27 and the front wall 28. The bearing 14 permits the small axial movement of the brake disc 23 relative to the carrier 15 necessary for braking.

The clutch pedal 22 and the normally open switch 25 are arranged in such a manner that the switch is not engaged by the pedal if it is desired only to disengage the clutch, but the pedal must be depressed further while the clutch is disengaged to brake the clutch shaft. An analogous arrangement is conventional in passenger cars equipped with automatic transmissions which are caused to shift down from high gear when the accelerator pedal is depressed to the limit.

While not specifically illustrated, it will be understood that the release bearing and brake mechanism in the clutch arrangements shown in FIGS. 1 and 3 are controlled by a pedal, switch, and valve in the manner more fully shown in FIG. 2.

In the device illustrated in FIG. 3, the brake disc 33 of the brake mechanism 2" has a tubular sleeve portion splined to the clutch shaft 1 and projecting axially from both radial engagement faces of the disc. Needle bearings 14a, 14b on the two projecting sleeve portions respectively support a housing wall 41 of the brake mechanism 2" and the carrier 15 of the clutch release bearing 4' to which the inner bearing ring 13' is fastened. The front face of the bearing ring 13', which is directed toward the right in FIG. 3, engages clutch release levers, not shown, to release the shaft 1 from the driven clutch portion. The outer bearing ring 26, the other radial housing wall 37, and a spacer ring 19 are fixedly fastened to the housing wall 41, and compressed air admitted to a chamber 9 in the wall 41 through a port 16 may cause a flexible diaphragm 10 sealing the chamber 9 to move a pressure plate 38 toward the disc 33 in the manner described above, the pressure plate being secured against angular displacement by the spacer ring 19.

The housing of the brake mechanism 2" and the clutch release bearing 4' are moved jointly by the non-illustrated fork which engages the hub portion of the wall 41 and prevents rotation of the wall and of associated elements about the axis of the clutch shaft 1. The needle bearings 14a, 14b permit limited axial movement of the brake disc 33 relative to the housing and the clutch release bearing.

It should be understood, of course, that the foregoing disclosure relates only to a preferred embodiment of the invention, and that it is intended to cover all changes and modifications of the examples of the invention herein chosen for the purpose of the disclosure which do not constitute departures from the spirit and scope of the invention set forth in the appended claims.

What is claimed is:

1. A braked clutch arrangement comprising:
   a. a support including a housing;
   b. a clutch shaft rotatable relative to said support about an axis;
   c. a brake member enveloped by said housing and axially movable on said shaft in angularly secured relationship;
   d. a friction member secured on said support in said housing against rotation about said axis;
   e. pressure-fluid operated moving means for moving said brake member into engagement with said friction member,
      1. said moving means including a pressure member axially movable in said housing in angularly secured relationship and engageable with said brake member for pressing the brake member axially against said friction member;
   f. clutch release means for releasing said shaft from a driven clutch portion, said clutch release means including a clutch control member mounted for movement between an inoperative position and a clutch releasing position, and further beyond said clutch releasing position; and
   g. fluid control means responsive to said further movement for controlling flow of pressure fluid to said moving means.

2. An arrangement as set forth in claim 1, wherein a yieldably resilient member and said housing bound a chamber connected to said fluid control means for flow of fluid into said chamber, said resilient member engaging said pressure member and moving the engaged pressure member axially toward said brake member under the pressure of fluid in said chamber.

3. An arrangement as set forth in claim 2, wherein said clutch release means further include a clutch release bearing, a sleeve member coaxially enveloping said shaft and fixedly fastened to said housing, said clutch release bearing being axially movable on said sleeve member.

4. An arrangement as set forth in claim 2, wherein said clutch release means further include a clutch release bearing including inner and outer bearing rings coaxial with said shaft, one of said bearing rings being fixedly fastened to said housing, and the other bearing ring carrying engagement means for engagement with said driven clutch portion.

5. An arrangement as set forth in claim 4, further comprising another bearing coaxially interposed between said shaft and said other bearing ring.

* * * * *